United States Patent
Swanson

(10) Patent No.: US 12,092,940 B2
(45) Date of Patent: Sep. 17, 2024

(54) BEAM SCANNING WITH TUNABLE LASERS

(71) Applicant: Eric Swanson, Gloucester, MA (US)

(72) Inventor: Eric Swanson, Gloucester, MA (US)

(73) Assignee: Eric Swanson, Gloucester, MA (US)

(*) Notice: Subject to any disclaimer, the term of this patent is extended or adjusted under 35 U.S.C. 154(b) by 0 days.

(21) Appl. No.: 17/741,706

(22) Filed: May 11, 2022

(65) Prior Publication Data

US 2022/0365277 A1    Nov. 17, 2022

Related U.S. Application Data

(60) Provisional application No. 63/214,280, filed on Jun. 24, 2021, provisional application No. 63/189,560, filed on May 17, 2021.

(51) Int. Cl.
| | |
|---|---|
| G02F 1/295 | (2006.01) |
| G01S 7/481 | (2006.01) |
| G02B 6/00 | (2006.01) |
| G02B 6/12 | (2006.01) |

(52) U.S. Cl.
CPC ............ G02F 1/295 (2013.01); G01S 7/4817 (2013.01); *G02B 2006/0098* (2013.01); *G02B 6/12016* (2013.01); *G02B 2006/12121* (2013.01)

(58) Field of Classification Search
CPC ....... G02F 1/295; G02F 1/2955; G01S 7/4817
See application file for complete search history.

(56) References Cited

U.S. PATENT DOCUMENTS

| | | | |
|---|---|---|---|
| 10,649,306 B2 | 5/2020 | Skirlo et al. | |
| 2013/0279849 A1* | 10/2013 | Santori | G01J 3/12 385/37 |
| 2014/0376001 A1* | 12/2014 | Swanson | G02B 6/29302 356/479 |
| 2017/0279537 A1* | 9/2017 | Kim | G02F 1/292 |
| 2018/0088439 A1* | 3/2018 | Inoue | G02F 1/2955 |
| 2020/0225332 A1* | 7/2020 | Wagner | G01S 7/4863 |
| 2021/0405201 A1* | 12/2021 | Wagner | G01S 17/894 |

FOREIGN PATENT DOCUMENTS

WO    WO 2022/236183 A1 * 11/2022

OTHER PUBLICATIONS

T. Chan et al. 2-dimensional beamsteering using dispersive deflectors and wavelength tuning. Optics Express, 16:19:14617-14628, Sep. 15, 2008. (https://doi.org/10.1364/OE.16.014617) (Year: 2008).*
N. Dostart et al. Serpentine optical phased arrays for scalable integrated photonic lidar beam steering. Optica, 7:6:726-733, Jun. 2020. (https://doi.org/10.1364/OPTICA.389006) (Year: 2020).*

* cited by examiner

*Primary Examiner* — Michael Stahl
(74) *Attorney, Agent, or Firm* — Rauschenbach Patent Law Group, PLLC; Kurt Rauschenbach

(57) ABSTRACT

An optical system includes a tunable laser that generates an optical signal at an output that is wavelength tunable. A wavelength router directs particular wavelength bands of the optical signal to particular ones of the plurality of outputs. An optical emitter emits an optical beam at an output, wherein tuning the tunable laser steers the emitted beam.

19 Claims, 9 Drawing Sheets

Example Of Prior Art

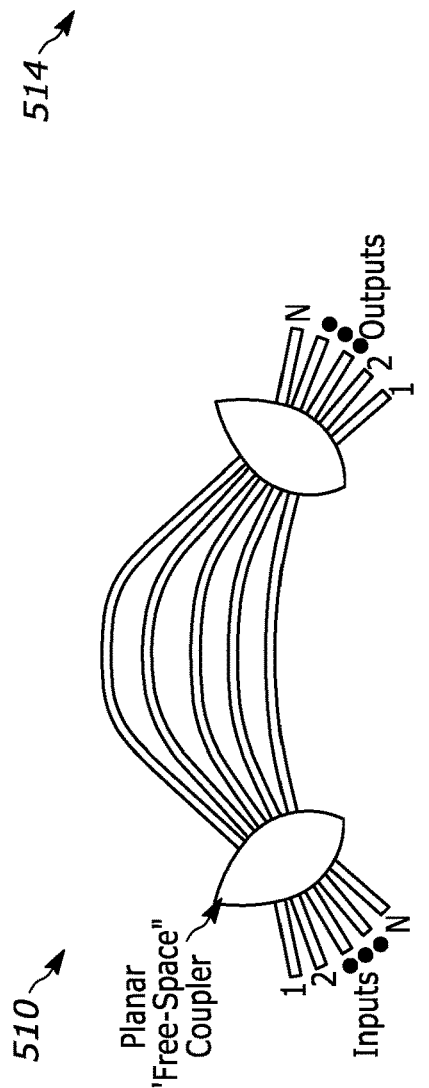
FIG. 5C
(Prior Art)
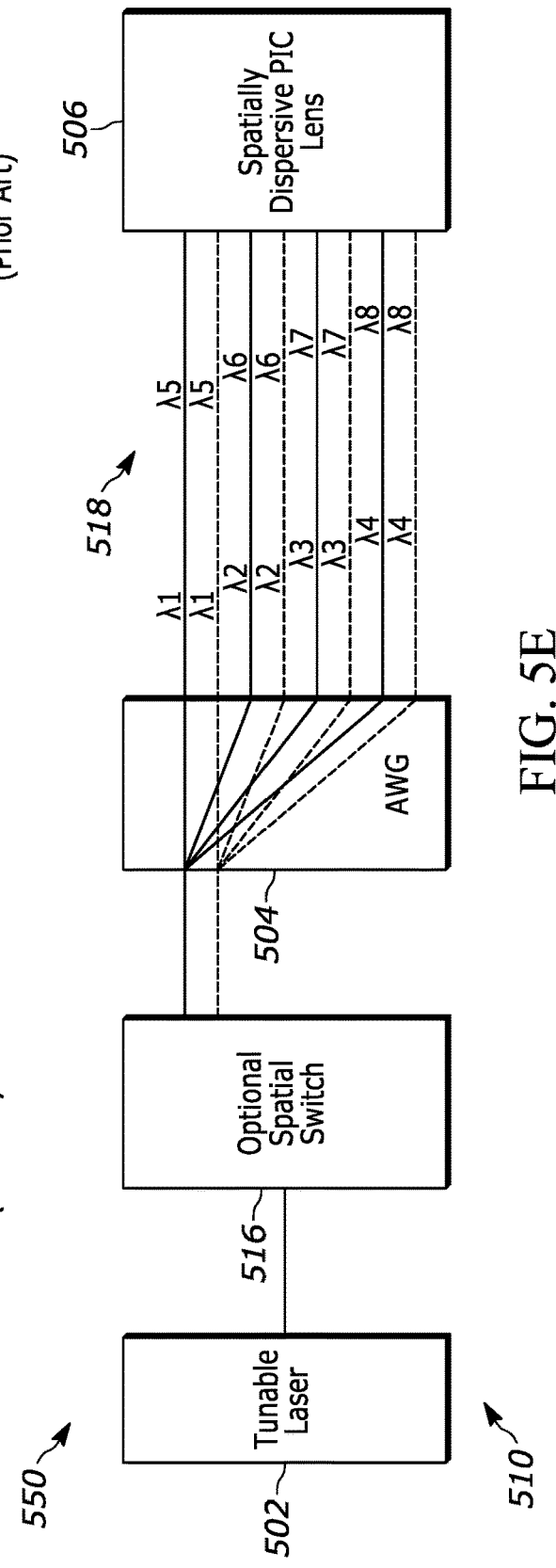
FIG. 5D
(Prior Art)
FIG. 5E

BEAM SCANNING WITH TUNABLE LASERS

The section headings used herein are for organizational purposes only and should not be construed as limiting the subject matter described in the present application in any way.

CROSS REFERENCE TO RELATED APPLICATIONS

The present application is a non-provisional application of U.S. Provisional Patent Application No. 63/189,560, entitled "Beam Scanning with Tunable Lasers" filed on May 17, 2021 and is also a non-provisional application of U.S. Provisional Patent Application No. 63/214,280, entitled "Beam Scanning with Tunable Lasers", filed on Jun. 24, 2021. The entire contents of U.S. Provisional Patent Application Nos. 63/189,560 and 63/214,280 are herein incorporated by reference.

INTRODUCTION

Two-dimensional optical beam scanning is important for a wide variety of applications ranging from LiDAR, medical imaging, and other types of imaging and sensing. There are many known methods for optical beam scanning including optomechanical devices (e.g. galvanometric beam scanning, or voice coil or PZT actuated mirrors), liquid crystals, electrooptical devices, optical phased arrays, tunable lasers and spatially diffractive elements. and more. Some of the most promising approaches to achieve low cost and a compact size is to use integrated photonics. One example of the prior art is shown in FIG. 1 (See U.S. Pat. No. 10,649,306), where there is a tunable laser, and a spatial switching tree of cascaded Mach Zehnder switches followed by an aplanatic lens and a surface grating emitter. The entire structure can be integrated on one or more PICs using SiO2, silicon nitride, amorphous silicon, InP, or many other PIC materials or combination of PIC materials. By adjusting the routing of light through the spatial switch fabric, the beam can be steered mainly in one direction and by adjusting the wavelength the beam can be steered mainly in the other direction. One of the limitations of this approach is it is difficult to scale the switch to a large number of elements without adding optical loss, power consumption, control circuits, and/or other complexity to the system. As such, improvements are needed in two-dimensional beam scanner technology.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The person skilled in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way. It should be understood that many of the figures described in the following paragraphs are drawn to illustrate concepts and embodiments of the present teaching, but are not necessarily drawn to scale and often they are simplified drawings omitting known structural and functional elements and/or simplifying optical beam propagation in a way that is known to those skilled in the art.

FIG. 5C illustrates a conceptual example embodiment of an integrated arrayed waveguide router that can be used in the scanner of FIG. 5A.

FIG. 5D illustrates an embodiment of an integrated spatially dispersive lens that can be used in the scanner of FIG. 5A.

FIG. 5E illustrates an embodiment of a simplified block diagram of an optical beam scanning configuration using a tunable laser, optical spatial switch, arrayed waveguide router, and a spatially dispersive PIC lens of the present teaching.

DESCRIPTION OF VARIOUS EMBODIMENTS

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

One of the central concepts of the present teaching is to eliminate or augment the need for spatial switches, and/or complex adjustable two-dimensional (2D) phased array emitters, to achieve 2D scanning of an optical beam. In one embodiment beam scanners of the present teaching utilize the attributes of a tuned laser's wavelength (or, equivalently, tuned optical frequency) to steer a beam in two dimensions using a wavelength routing element to spatially disperse a light path followed by an emitter element that has one or more input ports and a wavelength dependent emission for each input. In another embodiment, there is a two-dimensional wavelength sensitive emitter array.

Figure 1:
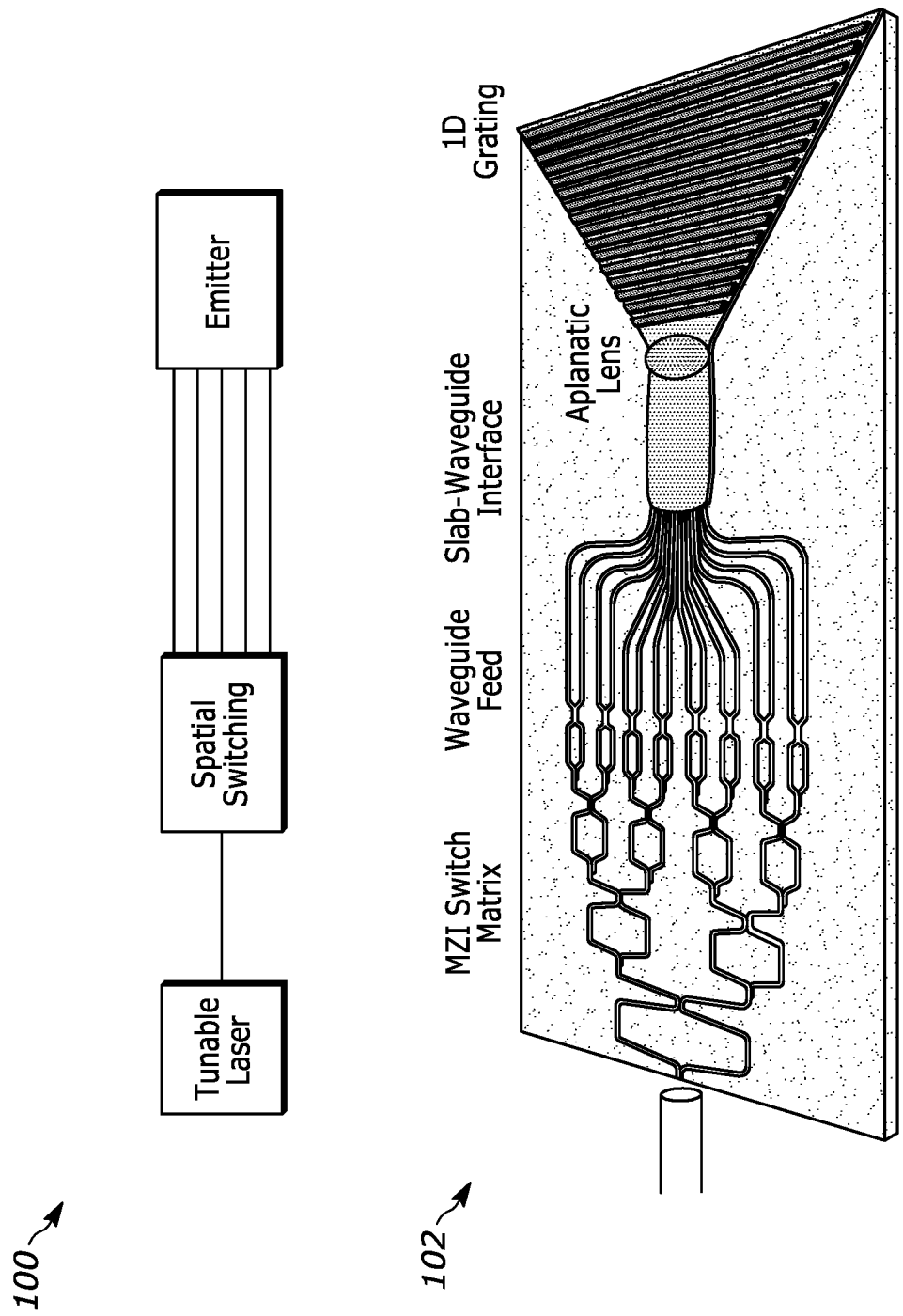
FIG. 1 illustrates a known 2D optical beam scanning configuration.

Optical beam scanning can be performed using a spatial switches and wavelength sensitive angular or spatial emission elements. FIG. 1 illustrates a known 2D optical beam scanning approach. See, for example, U.S. Pat. No. 10,649,306, which is incorporated herein by reference. A simplified block diagram of the beam scanner 100 is shown. An example implementation using a photonic integrated circuit 102 is also shown. The present teaching describes systems and methods to augment and improve this and other known scanners. For example, one such improvement eliminates the need for spatial switches by taking further advantage of the tunability of a laser source.

Figures 2A, 2B:
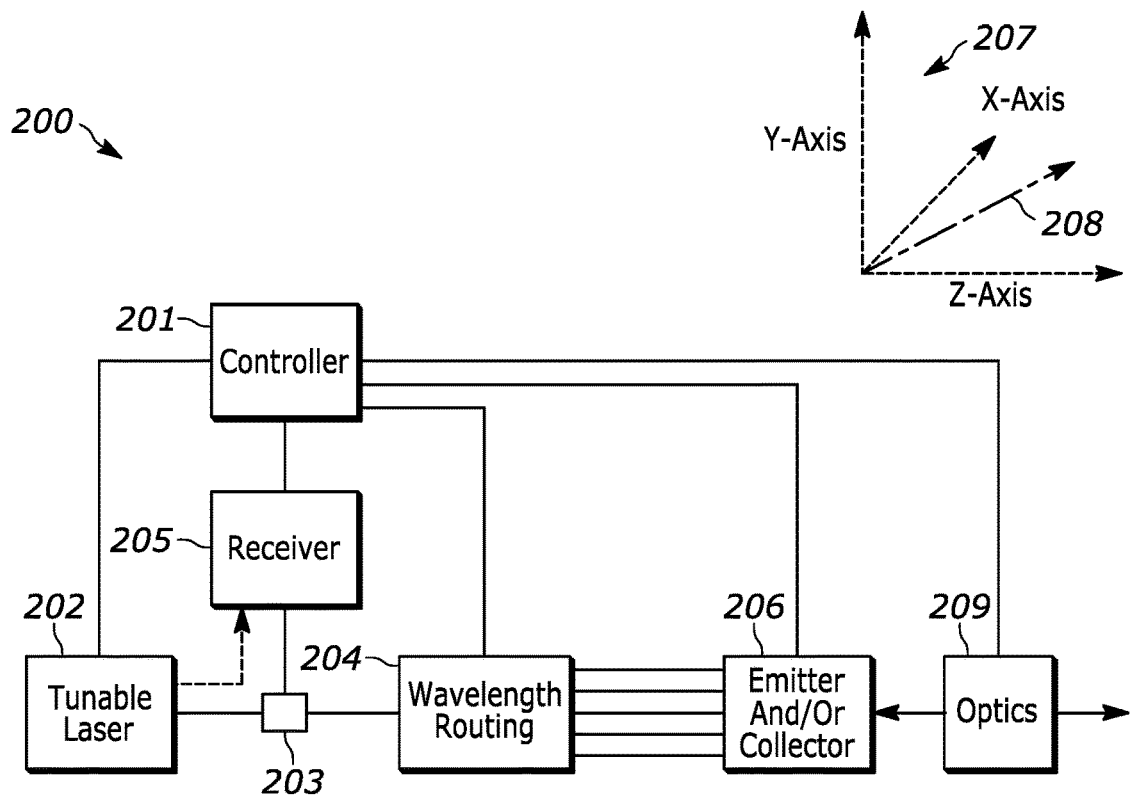
FIG. 2A illustrates an embodiment of a simplified block diagram of an optical beam scanner using a tunable laser, a wavelength routing element, and an emitter of the present teaching.
FIG. 2B illustrates example optical transfer functions of the wavelength routing element described in connection with FIG. 2A.

FIG. 2A illustrates an embodiment of a simplified block diagram of an optical beam scanner 200 using a tunable laser 202, a wavelength routing element 204, and an emitter 206 of the present teaching. The beam scanning system 200 has a controller 201 that allows for, where desired, communication, control, monitoring, and data I/O with the various elements that make up beam scanning system 200. Not all of the elements shown connected need to be connected in all embodiments, and, in some embodiments there may be additional connections for added functionality. For example, in some embodiments, there is no need to control the optical elements, labeled optics 209 that follow the emitter/collector 206. The elements of the scanner 200 include one, or more, tunable transmitter lasers 202 that generate an optical signal at a desired wavelength that can be tuned and that is followed by a wavelength routing element 204 having multiple output ports which is then followed by an emitter 206 having one or more input ports whose output emission angle is wavelength and input port sensitive. In some embodiments, the wavelength routing element 204 can be considered to be analogous to a wavelength division demultiplexer (e.g. WDM demux) when viewed from signal flow from left-to-right in the diagram, or a WDM multiplexer when viewed from signal flow from right to left in the diagram. In some embodiments, the emitter 206 can also act as a collector. That is, the scanner system 200 can work in both the forward and reverse direction owing to reciprocity. Further, in some embodiments light is emitted from the emitter 206 and there is a separate optical collector (not shown). The collector can utilize a single or a multielement array for collection that is coupled to a receiver system and vis versa.

The controller 201 can be used to control a wavelength output from the tunable laser to steer the output angle of the light from the scanner 200 based on input from a user and/or other instrument controller (not shown). The controller 201 can be used to control a wavelength output from the tunable laser to automatically steer the output angle of the light from the scanner 200. The controller 201 can control features of the wavelength router 204 to ensure the desired wavelength routing properties. For example, it may control thermal or electrooptical elements within 204 to keep it stable over environmental conditions. Further it is possible to change the wavelength routing transfer function. But in one embodiment, the wavelength routing table is static and is not changed and remains stable over environmental conditions. The controller 201 can also be used to stabilize the emitter optical properties (e.g., stabilize over environmental temperature) or even actively change the spatially dispersive characteristics through mechanical or electrooptical effects. In one embodiment, the optical properties of the emitter 206 are fixed and stable over environmental conditions.

In some embodiments of the scanner 200 of FIG. 2A the emitter 206, both emits lights and collects light. The tunable transmitter laser 202 is connected to optional transmitter/receiver diplexer 203. There are a variety of possible types of diplexers including simple passive optical couplers, faraday circulators and other active or passive elements. An example of an active element could be an optical transmit/receive switch. One purpose of the diplexer 203 is to pass light transmitted by the laser 202 to the wavelength routing element 204. In embodiments in which the emitter 206 acts as both a collector and an emitter, the diplexer 203 directs collected light to the receiver 205. In coherent detection applications such as frequency modulated continuous wave (FMCW) LiDAR, it is possible to have both light collected from a target (not shown) and light directly from the tunable laser 202 coupled to the receiver 205 to allow for heterodyne or homodyne detection (illustrated by dotted line from laser 202 to receiver 205).

By adjusting the wavelength in the laser 202, the output port of the wavelength router 204 can be selected. That wavelength routing element 204 (e.g. WDM mux/demux) can be selected from a wide variety of known elements such as a band splitter, an arrayed waveguide router, an optical interleaver(s), or combinations of these and other elements. In some embodiments, the wavelength routing element 204 may be periodic in nature (either in frequency or in wavelength). In other embodiments, the wavelength routing element 204 is not strictly periodic. In yet other embodiments, the wavelength routing element 204 is not periodic at all. Each output port of the wavelength routing element 204 can contain one or more wavelength ranges and the light from the various ports is sent to a respective input port of the emitter 206. The emitter 206 is configured such that both the particular input port and the wavelength of the light entering the input port determine an emission angle 208 of the light shown in a coordinate system 207 having a z-axis that defines a primary optic axis of the scanner system 200. The emission angle 208 determines a position of a light beam from the scanner 200 in an x-y plane normal to the z-axis. As the scanner is adjusted, a pattern of the light beam position is formed in the x-y plane (or equivalently is steered in azimuth and elevation). In some embodiments there are additional passive or active optical elements 209 such as lens, steering mirrors, optical filters, shutters, etc. that further serve to scan and/or shape the optical beam emitted and/or collected from the scanner system 200. Known description of the properties of the emitter/collector 206 will not be repeated here. See, for example, U.S. Pat. No. 10,649,306. Conceptually there can beam expansion region that collects light from closely packed waveguide from the wavelength routing element 204. The expanded light is then fully or partially collimated by a planar lens. The collimated light then can be passed onto a surface grating or other type of grating where it is emitted into free space in a collimated or partially collimated beam where the emission angle is dependent on the optical wavelength of the light.

We note that a primary axis is not restricted to one direction, but rather is associated with the particular embodiment of the scanner 200 and generally points in a direction that light is projected from the scanner 200. Below are some examples to illustrate the point. In some embodiments, the primary axis is normal to a plane containing a top surface of a photonic integrated circuit. In many other embodiments, the primary axis is at an angle to a normal to a plane containing a top surface of a photonic integrated circuit. In other embodiments, the primary axis is normal to a plane containing an edge surface of a photonic integrated circuit. In other embodiments, the primary axis is at an angle to a normal to a plane containing an edge surface of a photonic integrated circuit. In some embodiments, the primary axis is normal to a plane containing an output port of the emitter 206. In some embodiments, the primary axis has a vectorial component that contains the normal to a plane containing an output of output optics 209 that are used to transform light emitted by the emitter element 206.

It should be understood that while integrating some or much of the system shown in 200 onto one or more photonic integrated circuits may offer the best combination of small size and low cost, it is possible to implement this architecture in bulk optical components or a combination of integrated and bulk optical components. One advantage of using a photonic integrated circuit is the ability to precisely control the optical path lengths, and as such accumulated optical phase, in the paths that form connections between the components.

As mentioned above, there are a wide variety of optical transfer functions that can be used for the wavelength routing element 204 to provide desired output scanning properties. FIG. 2B illustrates an embodiment of example optical transfer functions 211 of the wavelength routing element 204 of FIG. 2A. An example of sixteen monotonically and approximately equally spaced input wavelengths from tunable laser 202 are shown in the column labeled "Input Laser Wavelength". Wavelength routing table labeled Example 1 shows an example analogous to an optical band splitting WDM demux approach. In Example 1, consecutive groups of wavelengths are sent to each output port. Wavelength routing table labeled Example 2 shows an example analogous to an arrayed waveguide router or cascaded optical interleaver wavelength demux approach. Consecutive individual wavelengths are output at different ports, and the element is cyclic, in this example, after the fourth wavelength the cycle repeats. These are just two illustrative examples and there are a wide variety of possible transfer functions known in the art. For example, it is not necessary that the input wavelengths are equally spaced in wavelength or monotonic. In fact, in some embodiments it is preferable that the wavelengths are not equally spaced if the wavelength routing element 204 or emitter 206 or optics 209 have transfer functions in light of the desired 2D beam steering patter, that are not conducive to equally spaced input wavelengths. One key concept of scanners the present teaching is that the tunability of the laser in combination with the wavelength routing element function is being used to spatially separate the light and that spatial separation is exploited in combination with the wavelength sensitive emission from the emitter to assist in steering the output beam and/or collection of an input beam. This approach allows scanning/collecting to occur across two dimensions assisted by the spatial separation provided by the tunable laser and router element in combination with additional spatially dispersive characteristics of the emitter.

There are a wide variety of possible approaches to implement the wavelength routing element 204 including, for example, planar lightwave circuits, photonic integrated circuits, bulk optical interference filters, array waveguides, etc.

Light can be steered as it emerges from the emitter as described herein. For example, light can be steered by controlling the wavelength of the laser 202 with the controller 201. The steering generates desired patterns of light in an x-y plane at an output of the scanner 200. That steered light can be used in many types of applications including, for example, LiDAR, 3D sensing, imaging, and other applications. As the light is steered, or scanned, over, for example, a particular region of interest some of the light can be reflected, or otherwise altered by objects in the region of interest. In some applications, some light may be retroreflected by an object or target and, via reciprocity, will traverse back toward optical element 209, through emitter 206 and wavelength routing element 204 to diplexer 203 where it can be directed to the receiver 205 so coherent or incoherent detection can be performed. In some alternative embodiments (not shown), a complete separate path for the receiver light. In some embodiments, that path could have a single element collector or a collector array. Also, there could be a single element emitter or emitter array.

In some embodiments of the scanner system 200, light is coupled from the tunable laser transmitter 202 to the receiver 205 via a reference path (shown as the dotted line in FIG. 2A from laser 202 to receiver 205). This allows, for example, for coherent detection for applications such as FMCW LiDAR as understood by those skilled in the art. Numerous applications can be supported by the scanner 200 including direct detection LiDAR, coherent detection LiDAR, 3D sensing, medical imaging, facial recognition, and others.

As indicated above, the scanner 200 of FIG. 2A can be configured in different ways. In alternate embodiments, the tunable laser 202 can be a broad area emitter that directly illuminates the region of interest. That is the laser light from laser 202 does not pass transmitted through the wavelength router 204 and emitter 206. Rather, only the collection of the emitter 206 to the receiver 205 path is used. The selectivity of the emitter 206 collection to particular positions in the x-y plane provides a narrower beam scanning of the region of interest. In another embodiment, the tunable laser 202 is passed through the wavelength router 204 and emitter 206 and is used for scanning the region of interest and the collection to a receiver path is a separate broad area collection to detection path that is not shown in the figure. In yet another embodiment, the system uses the emitter 206 as both an emitter and a collector element. In these embodiments, both a narrow beam is used to scan the region of interest and a narrow beam is used to collect reflected light from the region of interest. It is also possible to have an active optical element(s) in the receiver 205 to allow for further optical isolation from collected light by the emitter 206.

As mentioned above, there are a variety of types of optical elements that can be used as part of the optics 209 to enhance the scanning emission and/or collection of light from a region of interests. In many embodiments the emitter 206 contains a region of light that needs to be collimated or nearly collimated to direct the light from emitter 206 to the distant region of interest for scanning. This can involve, for example circularizing the emitted beam from 206 (if required) through the use of cylindrical or aspheric optics and/or the use of anamorphic prisms as the output optics 209. It can also or instead involve an optical system that places the emitter 206 in nearly the focal plane of optics 209 so that light emitted for example light indicated along direction 208 is nearly collimated as it scans the region of interest.

One feature of the present teaching is that the combination of control over the laser 202 wavelength, the connectivity pattern(s) of the wavelength router 206 and the directivity of the emitter 206 supports numerous scan patterns to be produced by the scanner.

Figure 2C:
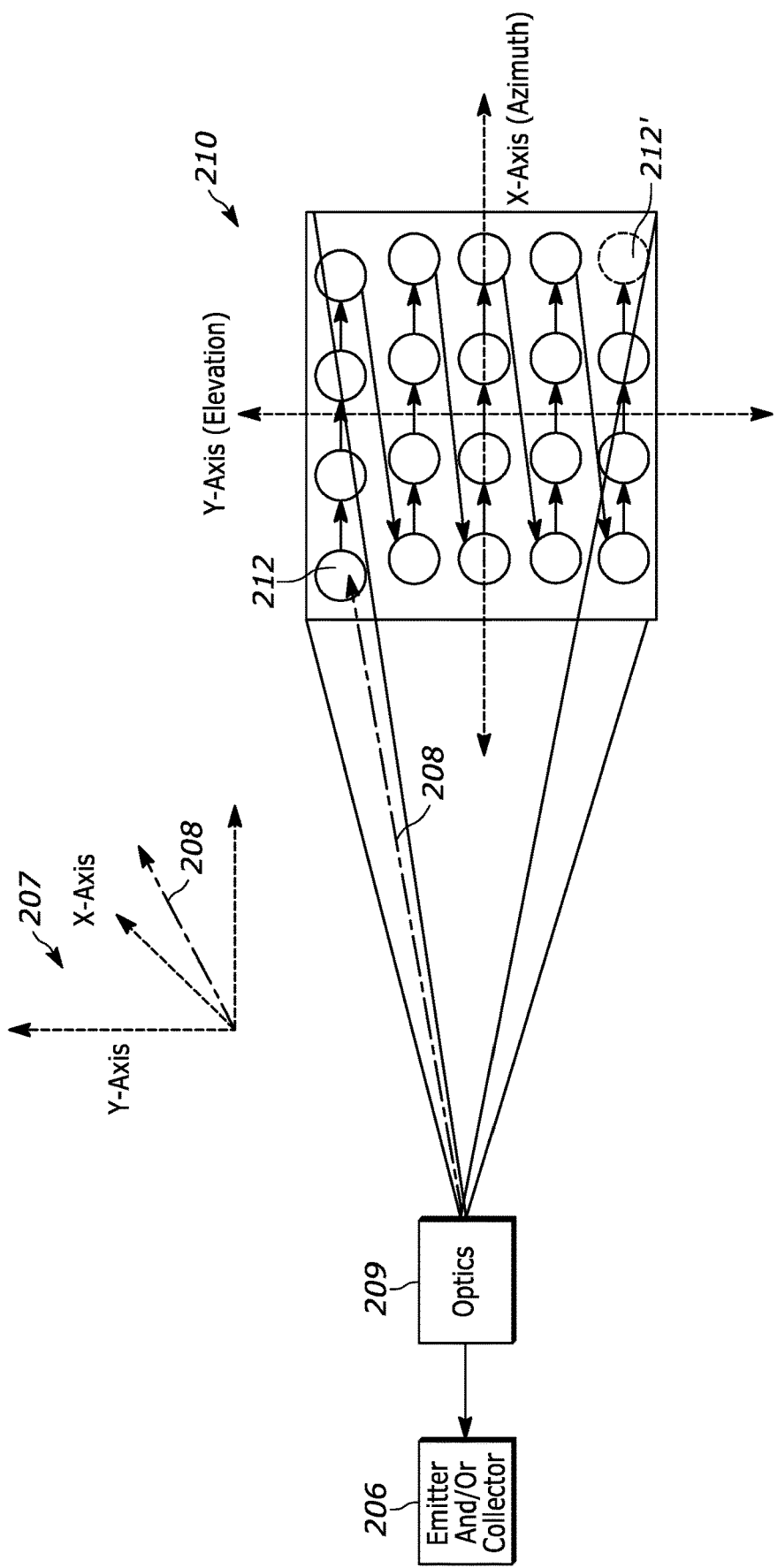
FIG. 2C illustrates an example scan pattern produced by the emitter and optics of the scanner described in connection with FIG. 2A.

FIG. 2C illustrates an example scan pattern 210 produced by scanner 200 embodiment of FIG. 2A. A raster shaped scan pattern 210 is shown. Conical scan patterns, serpentine scan patterns, and many other types of scan patterns are also possible. The desired scan pattern is determined by laser tuning characteristics and the optical transformations that occur in the wavelength router element 204, the emitter 206, and the optics 209 that are along the transmitter and/or receiver chain. A shape of the optical beam 212, here shown as circular, can be transformed by the output optics 209 as described herein. The beam angle of emitted light 208 as shown in the coordinate system 207 is changed to move the optical beam 212 from the first position along the path to an optical beam 212' at the end position. Note that as described previously, and further below, some of the spatial scanning occurs due to the spatial change that occurs from the wavelength routing element 204 (e.g. scanning along the y-axis or elevation axis) and some of the spatial scanning occurs due to the dispersive nature of the emitter 206 (e.g. scanning along the x-axis or azimuth axis) or combinations thereof.

It should be understood that in various embodiments, a laser that simultaneously emits multiple frequencies can be used to allow for parallel emission.

Figure 3A:
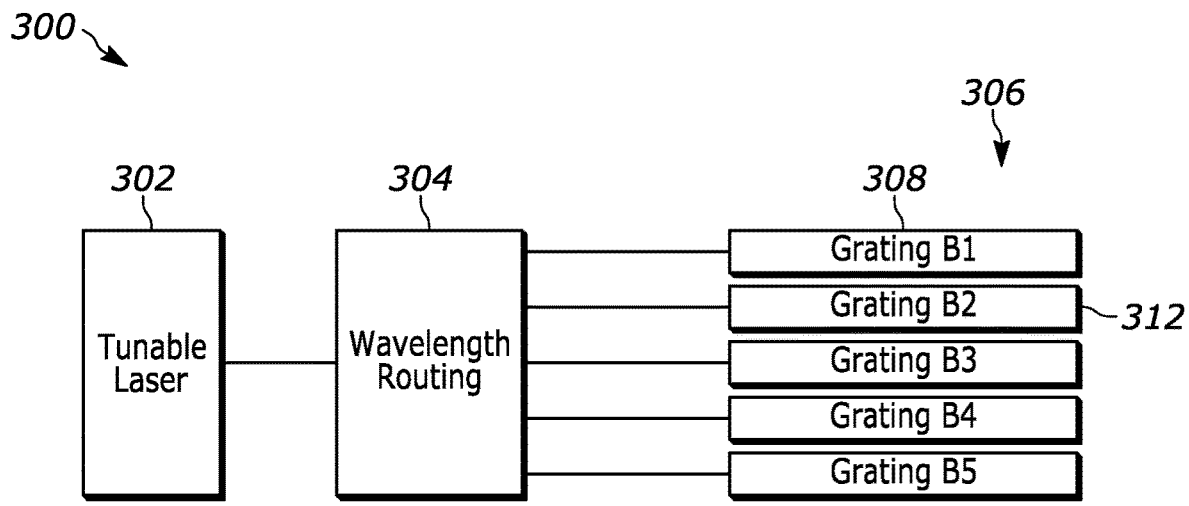
FIG. 3A shows an embodiment of a beam scanner where the wavelength routing element is a band splitter and the emitter consists of gratings each of whose emission angle is dependent on wavelength.
Figure 3B:
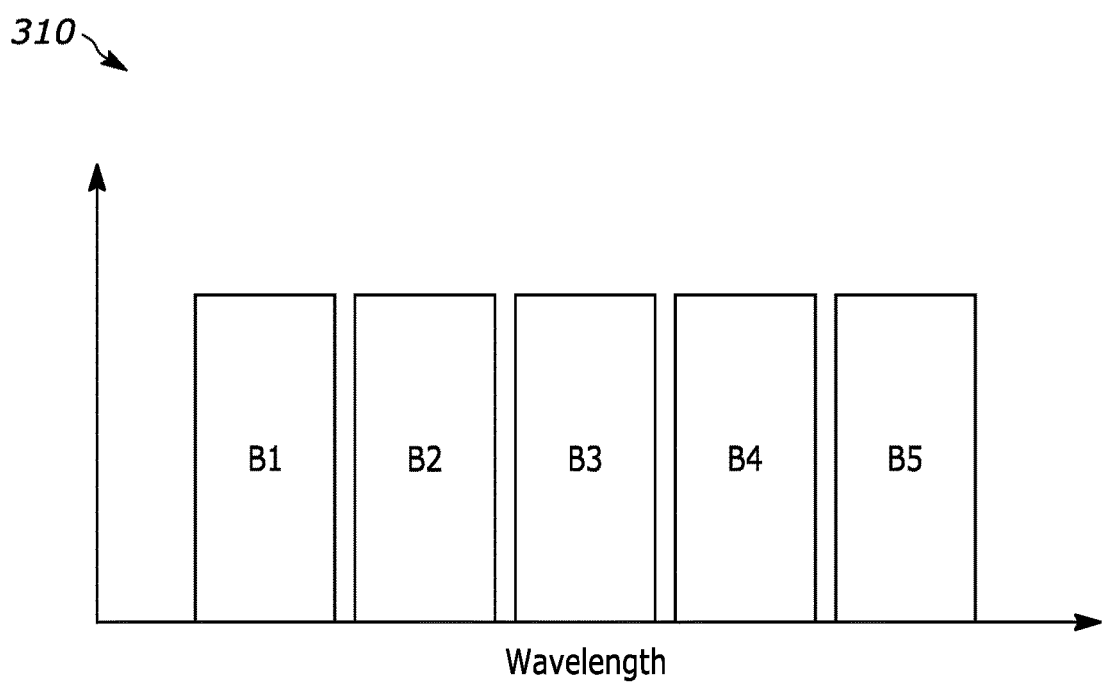
FIG. 3B shows a graph of wavelength groups produced by the tunable laser of the scanner of FIG. 3A.

FIG. 3A shows an embodiment of a beam scanner 300 where the wavelength routing element 304 is a band splitter and the emitter 306 consists of individual gratings 308 each of whose emission angle is dependent on wavelength. FIG. 3B shows an embodiment of a graph 310 of wavelength groups that can be accessed by the tunable laser 302 of the scanner 300 of FIG. 3A. Various spectral bands of wavelengths (i.e., groups) are also shown in the graph 310. Referring to both FIG. 3A and FIG. 3B, five bands are shown, B1-B5, in the graph 310, although a variety of number and/or shape of bands can be used. The group of wavelengths depicted in band 1 (e.g., B1) is steered by the wavelength routing element 304 to the top port where it is connected to the grating 308, B1. As the laser 302 is tuned across B1 the emission angle is tuned by the dispersion of the grating 308, grating B1. As the laser 302 is tuned further to B2, the light from the router 304 appears at the output connected to the next grating 312, grating B2. Like with grating B1 308, as the laser 302 is tuned across B2, the emission angle is tuned by the dispersion of the grating 312, grating B2. This continues as the laser 302 is tuned further through the bands B3-B5 associated with the router outputs connected to respective gratings B3-B5. So, it can be seen that two-dimensional steering is possible, with the router selecting the grating position (i.e. primarily a first dimension) and the dispersion of each grating selecting the emission angle primarily in a second dimension. The particular x-y position of the emitted beam is thus based on the wavelength of the laser 302. In various embodiments, the output light can be collected and projected using one or more of numerous types of lenses (not shown). In some embodiments, a cylindrical lens can be used. A cylindrical lens can advantageously symmetrize the emission angle, if needed and desired.

Figure 4A:
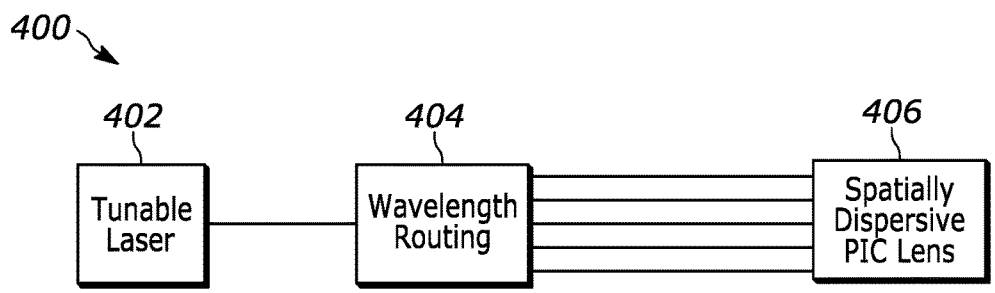
FIG. 4A illustrates an embodiment of a simplified block diagram of an optical beam scanner using a tunable laser, a wavelength routing element and spatially dispersive grating lens of the present teaching.
Figure 4B:
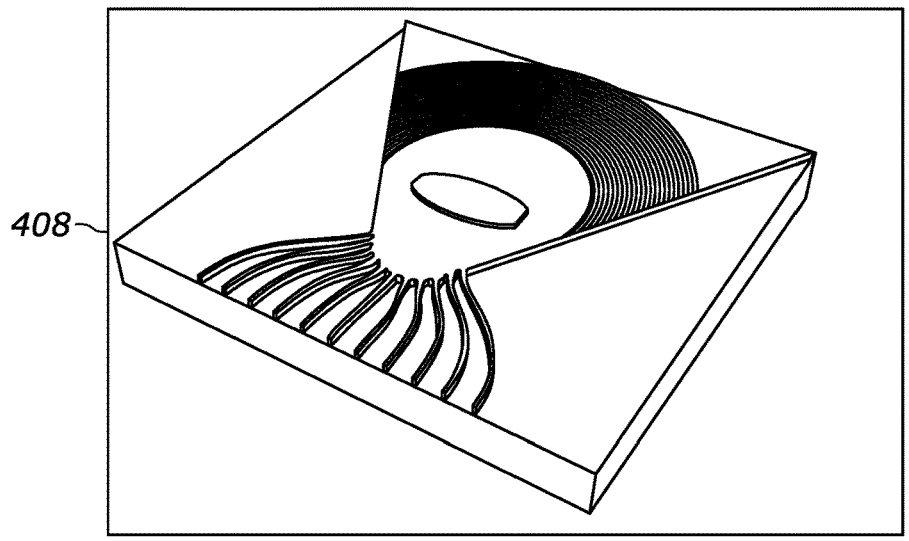
FIG. 4B illustrates an embodiment of an integrated spatially dispersive grating lens that can be used in the scanner of FIG. 4A.
Figure 4C:
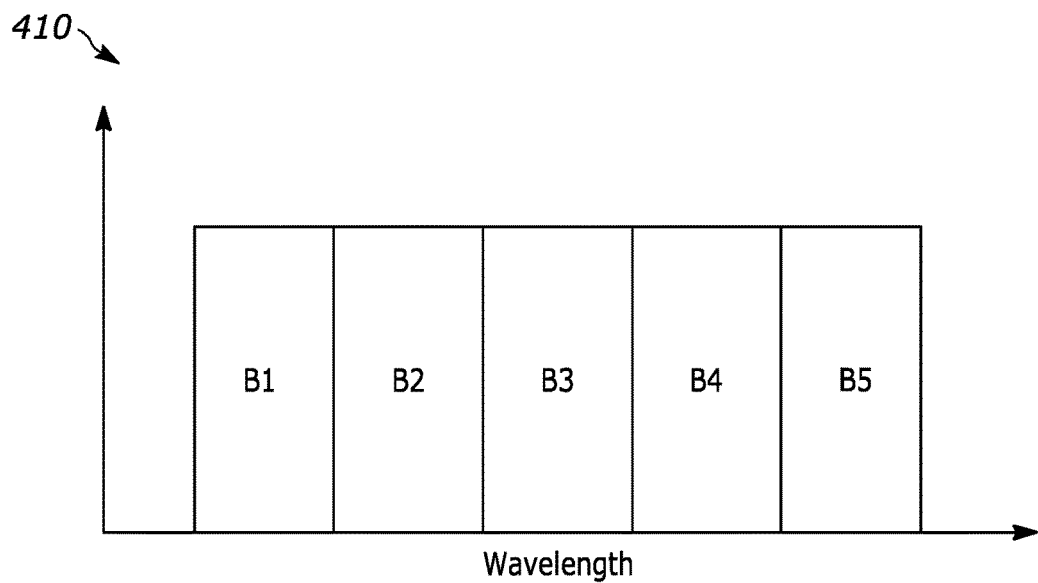
FIG. 4C illustrates an embodiment of a graph of wavelength groups produced by the tunable laser of the scanner of FIG. 4A.

FIG. 4A illustrates an embodiment of a simplified block diagram of an optical beam scanner 400 having a tunable laser 402, a wavelength routing element 404 and spatially dispersive grating lens 406 of the present teaching. FIG. 4B illustrates an embodiment of an integrated spatially dispersive grating lens 408 that can be used in the scanner of FIG. 4A. The example shown in FIG. 4B has a curved surface grating structures. But, as is known in the art, a wide variety of beam expansion, lens, and surface grating structures are possible including curved and straight. See, for example, U.S. Pat. No. 10,649,306, which is incorporated herein by reference. FIG. 4C shows an embodiment of a graph of wavelength groups produced by the tunable laser of the scanner of FIG. 4A. For simplicity, a receiver channel is not shown but could be added as described herein.

The tunable laser 402 is connected to the routing element 404 so that it can tune through and/or to specific wavelengths, e.g. wavelengths in the wavebands B1-B5 shown in the graph 410. The spatially dispersive lens 406 can be a Photonic Integrated Circuit (PIC) lens, an example of which is shown in element 408 of FIG. 4B. In some embodiments, the spatially dispersive lens 406 is designed to have a period structure so that the scan mostly repeats for each of the wavebands. That is, the scanning in the spatial dimension that is caused by the dispersion of the lens 406 is the same or similar for the tuning within each waveband B1-B5. The other spatial dimension is changed based on which waveband, B1, B2, B3, B4 or B5, is chosen and based on the routing of wavelength router 406. It is worth noting that the tuning control of tunable laser 402 can accommodate for variations in an optical transfer function of the PIC lens 406 and/or the wavelength routing element 404. That is, for example, if port 1 of the PIC lens 406 has a slightly different emission angle vs wavelength than port 5, this can be calibrated and adjusted appropriately to get the desired far-field scan pattern size, shape and/or pattern. For example, the scan can proceed as a raster scan, a conical scan, or other. A desired optical beam size and/or shape for each wavelength can also be produced.

Figure 5A:
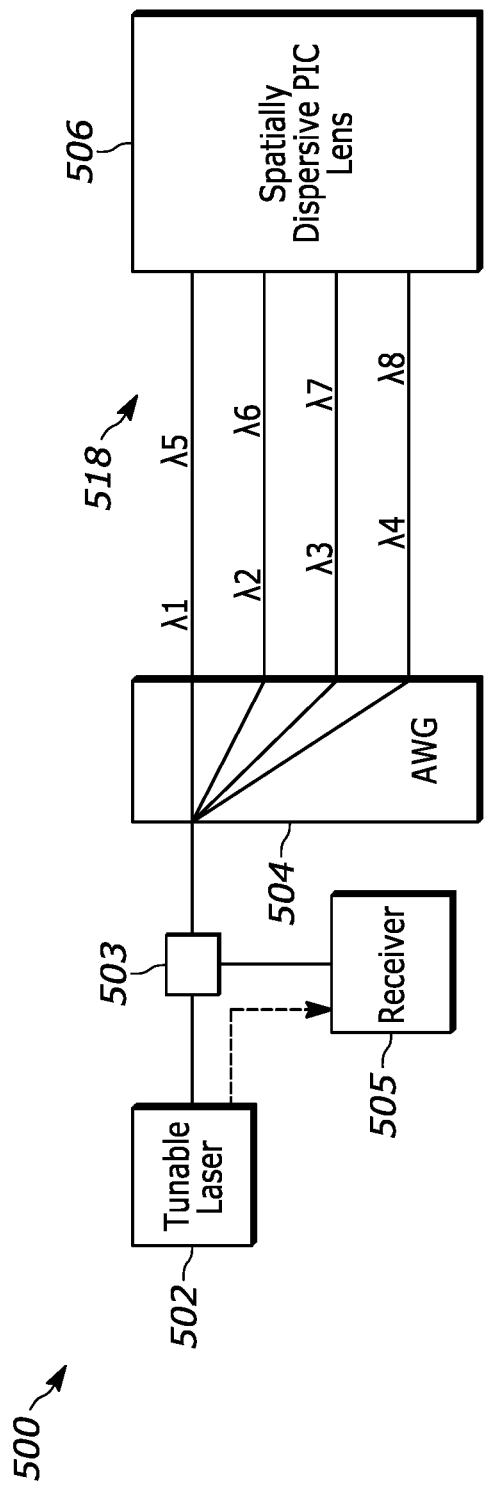
FIG. 5A illustrates an embodiment of a simplified block diagram of an optical beam scanning configuration using a tunable laser, an arrayed waveguide router and a spatially dispersive PIC lens of the present teaching.

FIG. 5A illustrates an embodiment of a simplified block diagram of an optical beam scanning approach using a tunable laser, a specialized arrayed waveguide router, and a spatially dispersive PIC lens of the present teaching. More specifically, FIG. 5A shows another embodiment of a beam scanner 500 where the tunable laser 502 is connected to diplexer 503 and then to an Arrayed Waveguide Router (AWG) 504 that is connected to a spatially dispersive PIC lens 506.

Figure 5B:
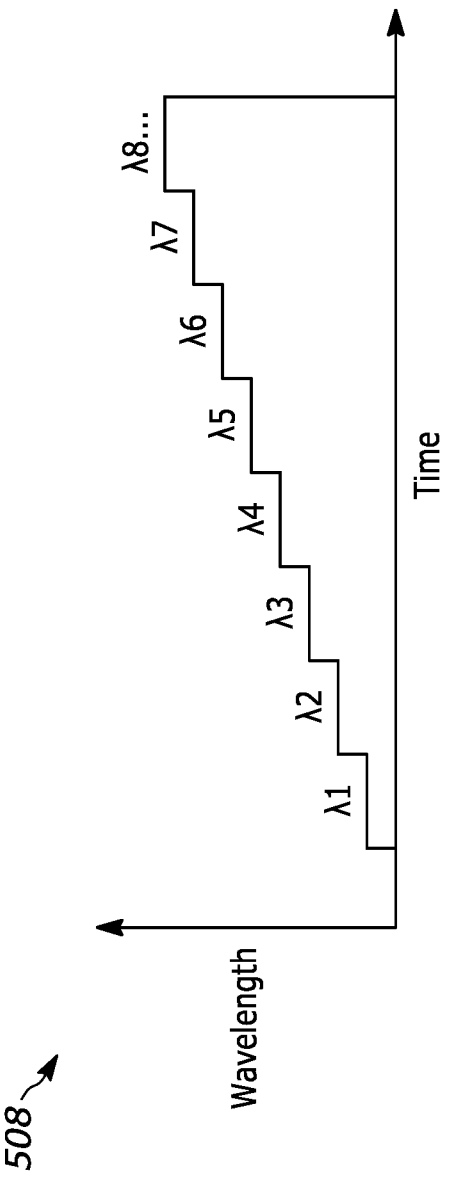
FIG. 5B illustrates an embodiment of a graph of wavelengths as a function of time produced by the tunable laser with the optical configuration described in connection with the scanner of FIG. 5A.

FIG. 5B illustrates an example embodiment of a graph of wavelengths as a function of time produced by the tunable laser of the scanner of FIG. 5A. The tuning diagram of the graph 508 shows the wavelengths are stepped in time through a sequence of approximately increasing values. But many other types of tuning patterns are possible and it is not necessary that the wavelength tuning be uniformly spaced steps or even monotonic in time. Having a wavelength agile tunable laser enables great flexibility in the choice of the wavelength routing element and the dispersive emitter.

FIG. 5C illustrates an embodiment of an integrated arrayed waveguide router that can be used in the scanner of FIG. 5A. The design of arrayed wave guide routers is well known in the art and this example is designed to be periodic or semi-periodic in is wavelength mapping. Further as just mentioned above the tunability of the laser can accommodate a wide range of wavelength router 504 transfer functions.

FIG. 5D illustrates a more detailed embodiment of an integrated spatially dispersive lens 514 that can be used in the scanner of FIG. 5A, which is known in the prior art. See, for example, U.S. Pat. No. 10,649,306, which is incorporated herein by reference. Referring to all of FIGS. 5A-D, as the laser is tuned from $\lambda 1$ to $\lambda 8$, the AWG (or other similar optical waveguide routing elements such as cascaded optical interleavers) can be designed to have the property such that the output is routed as shown by positions of representative wavelengths 518 at the various outputs of the AWG 504. This output is then coupled to a spatial dispersive PIC lens 506 (or other spatially wavelength dispersive element). The PIC surface lens 506 can be designed to have a periodic structure so that the emission angle is wavelength dependent. The laser 502 could be monotonically tuned as shown but a laser 502 can be used that can also randomly access any wavelength in which case any type of scan pattern is possible. Receiver 505 is also shown and can couple light collected by the spatially dispersive PIC lens 506, passing through router 504 and coupler or diplexer element 503. It is not necessary that the wavelengths be equally spaced as shown in FIG. 5B.

One feature of the present teaching is that by using wavelength (or frequency) alone to spatially scan a region of interest it is possible to provide useful scaling properties. To achieve, for example, a set of 100×100 far field spots would require 10,000 discrete frequencies which corresponds to a step size of ~2 GHz and a tuning range of ~100 nm at a nominal wavelength of 1.3 um. Lasers of this type are known to exist. As one example, such a source is used in the field of swept-source OCT. Such sources can tune at fairly high speeds (>10 kHz). Also, it is possible to design AWGs to have 100 or more ports.

FIG. 5E illustrates an embodiment of a simplified block diagram of an optical beam scanner 550 using a tunable laser 502, optical spatial switch 516, arrayed waveguide router 504 and a spatially dispersive PIC lens 506 of the present teaching. The tunable laser 502, arrayed waveguide router 504, and spatially dispersive PIC lens 506 can be the same or similar to those described in connection with the embodiment of FIG. 5A, and further can use the tuning curve, AWG and spatially dispersive lens embodiments described in connections with FIGS. 5B-D. The spatial switch 516 is added to further increase scanning capability in the number of far field spots that can be obtained for a given laser tuning range and wavelength router. A spatial switch 516, which may be a relatively small switch, e.g. having a small number of output ports, is inserted between the tunable laser 502 and the AWG 504 to further multiply the number of far-field spots possible for a given laser tuning range. The switch 516 connects the tunable laser 502 to different input ports of the AWG 504. For example, a single a 1:2 switch 516, together with wavelength routing in the AWG 504, allows 2× as many points in the far field. The switch can also have a larger number of output ports, as such, more than 2× as many points in the far field. The different wavelengths appear at output ports as shown in the labels 518. There are a wide variety of possible switch, wavelength router, emitter/collector parings and scaling's that can be achieved with this basic architecture. The embodiment is shown is just one example.

Figure 6A:
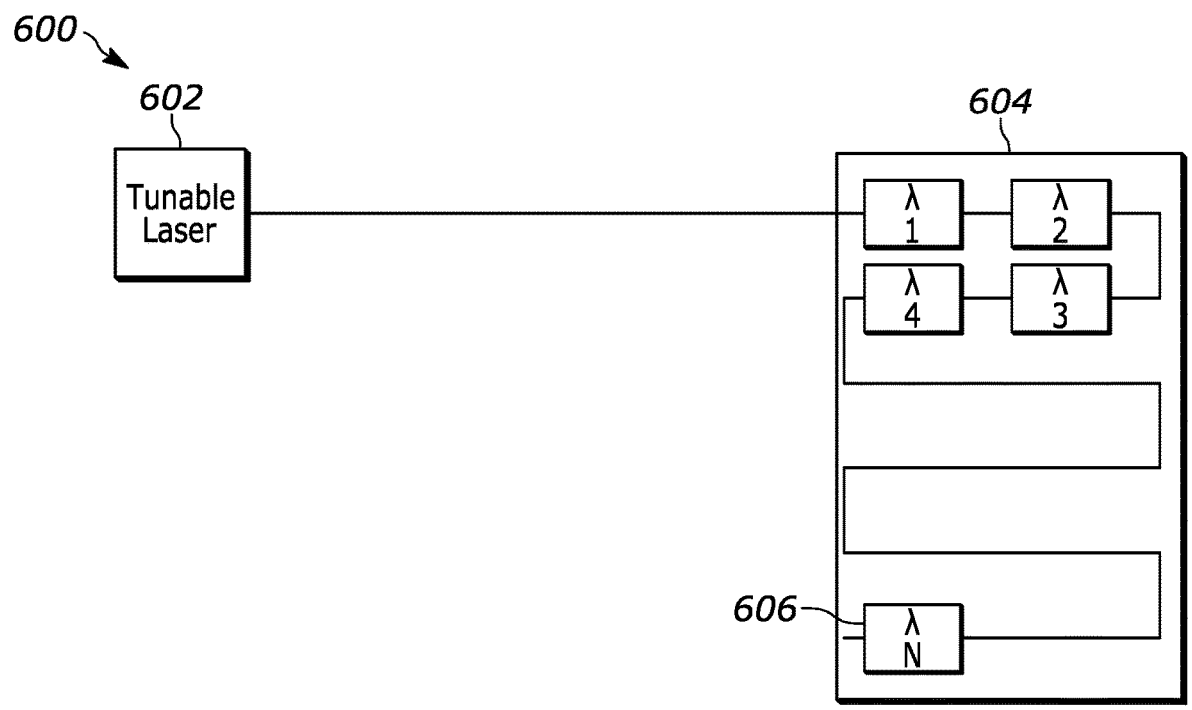
FIG. 6A illustrates an embodiment of a simplified block diagram of an optical beam scanner using a tunable laser and a serial bus of wavelength sensitive emitters of the present teaching.

One feature of the present teaching is that it supports a variety of configurations of wavelength sensitive emitters for which tuning the laser provides a desired two-dimensional scan pattern. This can be provided, for example, based on a particular connection configuration and relative positions of individual wavelength sensitive emitters in the scanner. FIG. 6A illustrates an embodiment of a simplified block diagram of an optical beam scanner 600 using a tunable laser 602 and a serial bus of wavelength sensitive emitters 604 of the present teaching. A tunable laser 602 provides a wavelength tunable output that is provided to a bus architecture of wavelength sensitive emitters 606. The emitter 604 has individual wavelength emitters connected in a bus, or serial, configuration as shown in the figure. When the wavelength associated with a particular one of the wavelength sensitive emitters 606 is tuned, the light is projected from the scanner 600 at the position of that wavelength sensitive emitter. As understood by those skilled in the art, the position on the emitter can be translated to a related output angle by a simple optical transformation, and these translations can be handled the same or differently for different directions. For example, the translations can be handled by using a lens. For example, a spherical lens can be used to convert them in two dimensions. Numerous configurations of output optics can be used to translate a position to an output angle in a desired way.

Figure 6B:
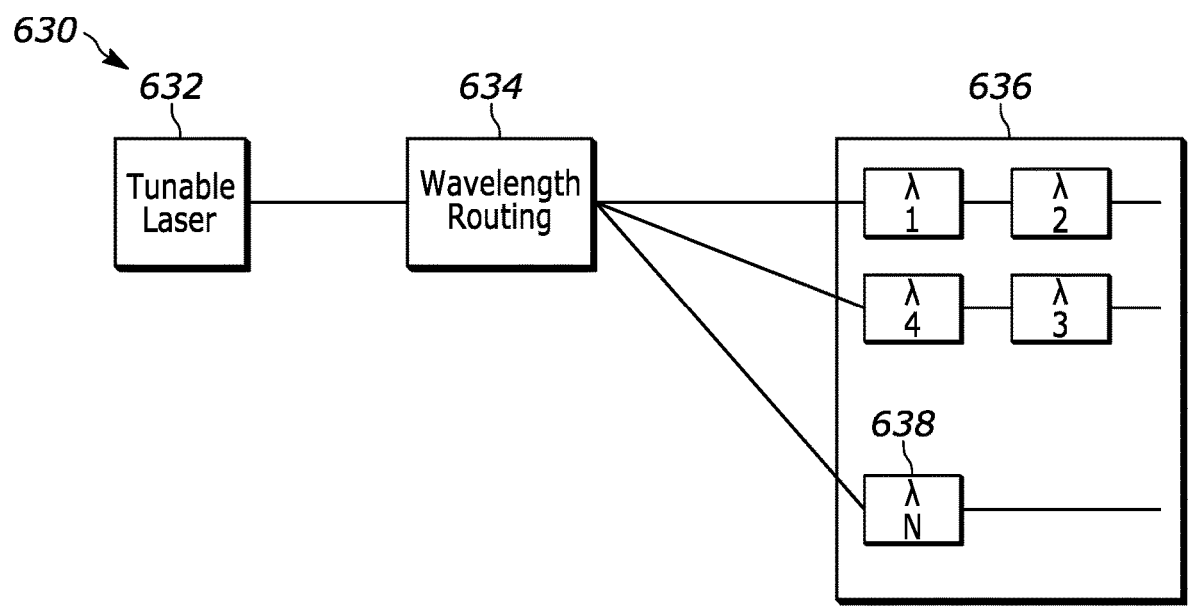
FIG. 6B illustrates an embodiment of a simplified block diagram of an optical beam scanner that uses a wavelength routing element and several buses of wavelength sensitive emitters of the present teaching.

FIG. 6B illustrates an embodiment of a simplified block diagram of an optical beam scanning approach that uses a wavelength routing element and several buses of wavelength sensitive emitters of the present teaching. A tunable laser 632 is used with an emitter 604, 636 that includes a bus architecture of wavelength sensitive emitters 638 that are additionally configured as multiple parallel busses. Each of the parallel busses of emitters 636 is connected to an output of a wavelength routing element 634 (e.g., band splitter, AWG, etc.). An advantage of this embodiment of the scanner 630 is that the total loss at the laser emitter XN can be lower than the loss at the emitter XN in the bus configuration of emitter 604 of FIG. 6A. This lower loss comes at the expense of requiring the additional wavelength routing element 634. One challenge of this approach can be that it is difficult to have the individual wavelength emitters on the PIC in close proximity of one another—so gaps in the emission pattern can result.

Figure 6C:
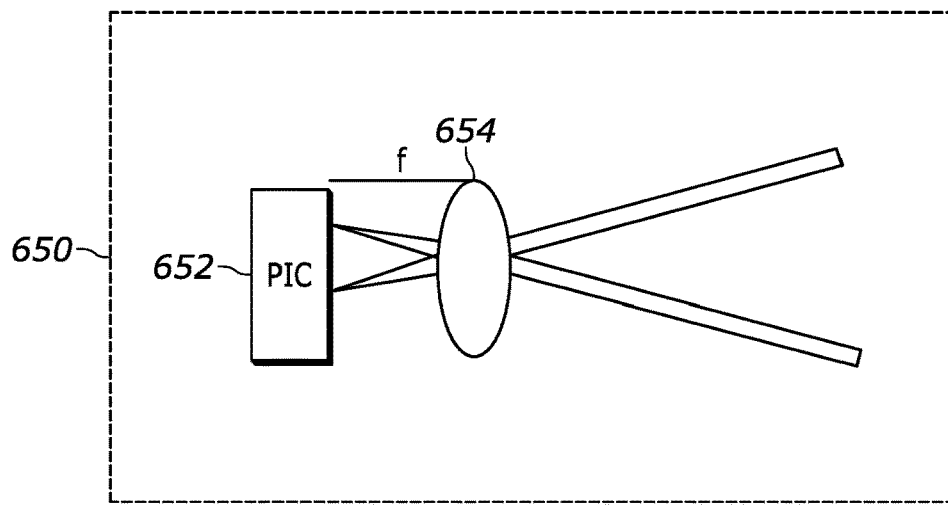
FIG. 6C illustrates an embodiment of a collimator that can be used for the beam scanner embodiments of FIG. 6A and FIG. 6B.

FIG. 6C illustrates an example embodiment of a collimator 650 that can be used for the beam scanner embodiments of FIG. 6A and FIG. 6B. The collimator 650 is a lens 654 that can be positioned at approximately a focal length from the photonic integrated circuit 652 that includes one of the emitters 604, 636 and their associated wavelength sensitive emitters. By collimating the output of each of the wavelength sensitive emitters as shown in the dotted box 650 the emission angle can be steered in two dimensions as the laser 602, 632 is tuned.

Figure 6D:
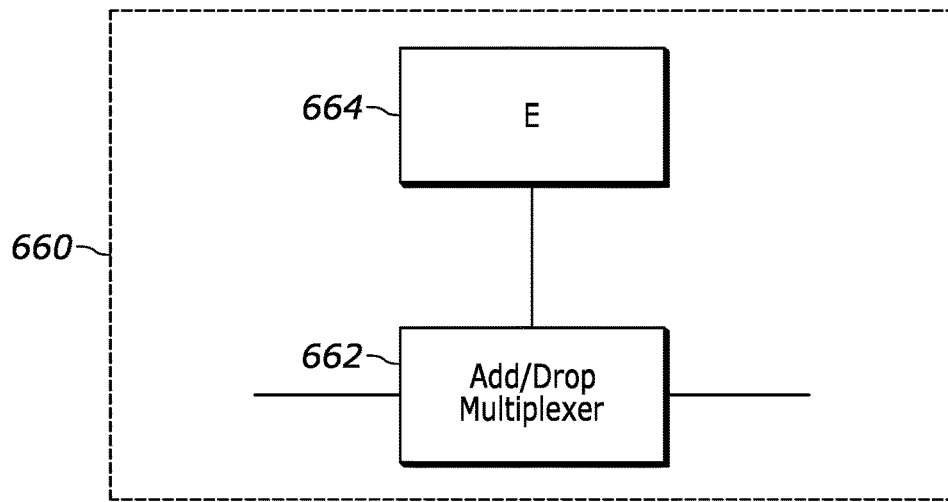
FIG. 6D illustrates an embodiment of an individual wavelength sensitive emitter that can be used in the bus-style emitters of FIGS. 6A-B.

There are many ways to implement the wavelength selective and emitter feature of the elements, wavelength sensitive emitters 606, 636, $\lambda i$, in bus-style emitters 604, 636. FIG. 6D illustrates an embodiment of an individual wavelength sensitive emitter 660 that can be used in the bus-style emitters 604, 636 of FIGS. 6A-B. The input is connected to an add/drop multiplexer 662 with a wavelength selective drop filter that is similar to add/drop multiplexers in optical WDM networks. The add/drop multiplexer 662 sends the particular wavelength to a surface emitter 664 that projects the beam out of the plane at the position of the individual wavelength sensitive emitter 660 on the bus and the rest of the wavelengths are passed along the bus.

Figure 6E:
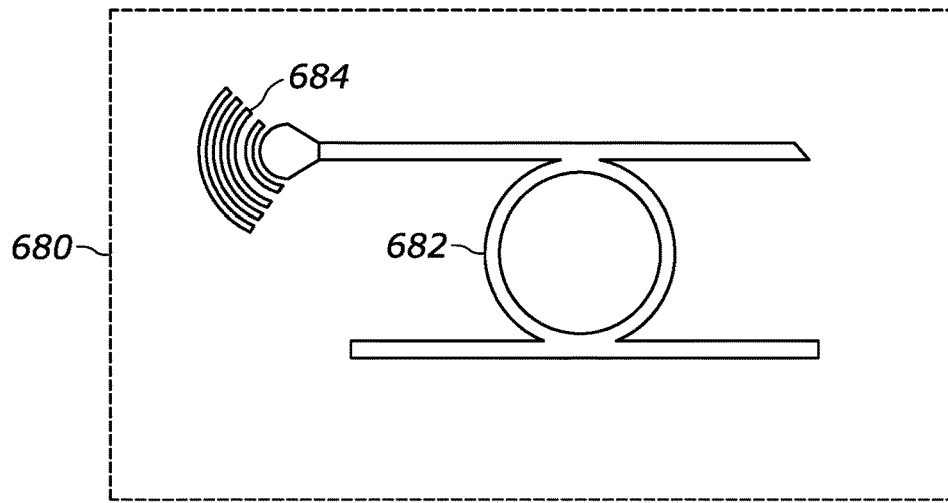
FIG. 6E illustrates another embodiment of an individual wavelength sensitive emitter that can be used in the bus-style emitters of FIGS. 6A-B.

FIG. 6E illustrates another example embodiment of an individual wavelength sensitive emitter 680 that can be used in the bus-style emitters 604, 636 of FIGS. 6A-B. The input is connected to a single ring resonator 682 coupled to surface grating emitter 684 both implemented on a photonic integrated circuit. More advanced, and higher "Q" wavelength selection, devices can also be used such as multiple ring resonators, one or more cascaded Mach Zehnder filters, and even bulk optical devices. Also, in some applications, it may be desirable to make the emission angle from the emitters (illustrated in FIGS. 6D and 6E) similar by designing each emitter element in the bus slightly different physically so that the appropriate far-field pattern is achieved. One approach for this for integrated photonic circuit applications is to tailor the design of a surface grating emitter to have similar azimuth and elevation angles for each of the emitters in 604 or 636.

Note that for simplicity, some of the figures above do not show receiver configurations. One skilled in the art will appreciate that various known receiver structures can be used with beam scanners of the present teaching. For example, an optical beam splitter or diplexer was discussed and can be used between the tunable laser and the wavelength routing element. The output of the optical beam splitter can provide a reference optical signal for a receiver. In a LiDAR or similar application, upon reflection of light from the target, some of the collected light can be directed to a receiver. In some embodiments, a Faraday circulator is used. In some embodiments it is possible to use a separate wide area receiver. Also as described herein, it is possible to have the systems shown (e.g., as shown in FIG. 2A) work in a bidirectional mode where there are narrow spatially illuminating beams on emission and collection, or a narrow illuminating spatial mode on emission and a separate broad spatially collecting receiver (flood mode receiver) or a broad spatially illuminating transmitter (flood mode transmitter) and a unidirectional mode on receiving/collecting. It is even possible to have two systems where there is an emitter array and a collector array. One advantage of separating the transmitter and receiver optical chains is in that configuration they are less susceptible to back scatter of a strong transmitter light masking a weaker reflection from a distant target. If the transmission distance is long enough a fast Transmitter/Receiver isolation switch and be added to the receiver or into the diplexer function.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. An optical beam scanning system comprising:
   a) a tunable laser that generates an optical signal having a tunable wavelength at an output;
   b) a wavelength router comprising an optical input that is optically coupled to the output of the tunable laser and a plurality of optical outputs, the wavelength router configured to direct the optical signal to a particular one of the plurality of outputs based on a wavelength band of the optical signal; and
   c) an optical emitter comprising a plurality of inputs, respective ones of the plurality of optical emitter inputs being optically coupled to respective ones of the plurality of outputs of the wavelength router, the optical emitter projecting at an output an optical beam comprising the optical signal having an angle with respect to a primary optical axis of the optical beam scanning system that is determined by the wavelength of the optical signal.

2. The optical beam scanning system of claim 1 wherein the angle with respect to the primary optical axis of the optical beam scanning system is tunable in two dimensions.

3. The optical beam scanning system of claim 1 wherein the wavelength router is configured to further direct the optical signal to a particular one of the plurality of outputs based on any of a set of periodically spaced wavelengths of the optical signal.

4. The optical beam scanning system of claim 1 wherein the wavelength router is configured to further direct the optical signal to a particular one of the plurality of outputs based on any of a set of aperiodically spaced wavelengths of the optical signal.

5. The optical beam scanning system of claim 1 wherein the optical emitter comprises a two-dimensional optical emitter.

6. The optical beam scanning system of claim 1 wherein the optical emitter comprises a grating device.

7. The optical beam scanning system of claim 1 wherein the optical emitter comprises a plurality of grating devices each having an input optically coupled to a respective one of the plurality of input ports of the optical emitter.

8. The optical beam scanning system of claim 1 wherein the optical emitter comprises a spatially dispersive lens.

9. The optical beam scanning system of claim 1 wherein the optical emitter comprises a serial bus having a plurality of wavelength sensitive emitters.

10. The optical beam scanning system of claim 1 wherein the optical emitter further comprises a lens.

11. The optical beam scanning system of claim 1 wherein at least one of the optical emitter, the wavelength router, and the tunable laser are formed on a photonic integrated circuit.

12. The optical beam scanning system of claim 1 further comprising a receiver optically coupled to the optical emitter.

13. The optical beam scanning system of claim 1 further comprising a spatial switch having an input optically coupled to the output of the tunable laser and at least two outputs optically coupled to a first and second input of the wavelength router.

14. An optical beam scanning system comprising:
    a) a tunable laser that generates an optical signal having a tunable wavelength at an output;
    b) an optical emitter comprising an input port optically coupled to a plurality of wavelength sensitive emitters, the plurality of wavelength sensitive emitters projecting at an output an optical beam comprising the optical signal having an angle with respect to a primary optical axis of the optical beam scanning system and steering the beam in 2D that is determined by a wavelength of the optical signal, thereby steering the beam in two dimensions; and
    c) a wavelength router positioned between the tunable laser and the plurality of wavelength sensitive emitters.

15. The optical beam scanning system of claim 14 wherein the plurality of wavelength sensitive emitters is configured as a serial bus.

16. The optical beam scanning system of claim 14 wherein at least one of the plurality of wavelength sensitive emitters comprises a wavelength demultiplexer.

17. The optical beam scanning system of claim 14 wherein at least one of the plurality of wavelength sensitive emitters includes a ring resonator element.

18. An optical beam scanning system comprising:
a) a tunable laser that generates an optical signal having a tunable wavelength at an output;
b) a wavelength router comprising an optical input that is optically coupled to the output of the tunable laser and a plurality of optical outputs, the wavelength router configured to direct the optical signal to a particular one of the plurality of outputs based on a wavelength of the optical signal, and configured to further direct the optical signal to a particular one of the plurality of outputs based on any of a set of aperiodically spaced wavelengths of the optical signal; and
c) an optical emitter comprising a plurality of inputs, respective ones of the plurality of optical emitter inputs being optically coupled to respective ones of the plurality of outputs of the wavelength router, the optical emitter projecting at an output an optical beam comprising the optical signal having an angle with respect to a primary optical axis of the optical beam scanning system that is determined by the wavelength of the optical signal.

19. An optical beam scanning system comprising:
a) a tunable laser that generates an optical signal having a tunable wavelength at an output;
b) a wavelength router comprising an optical input that is optically coupled to the output of the tunable laser and a plurality of optical outputs, the wavelength router configured to direct the optical signal to a particular one of the plurality of outputs based on a wavelength of the optical signal; and
c) an optical emitter comprising a plurality of input ports, respective ones of the plurality input ports of the optical emitter being optically coupled to respective ones of the plurality of outputs of the wavelength router, and comprising a plurality of grating devices each having an input optically coupled to a respective one of the plurality of input ports of the optical emitter, the optical emitter projecting at an output an optical beam comprising the optical signal having an angle with respect to a primary optical axis of the optical beam scanning system that is determined by the wavelength of the optical signal.

* * * * *